(12) United States Patent
Huggins et al.

(10) Patent No.: US 6,505,840 B2
(45) Date of Patent: Jan. 14, 2003

(54) QUICK CHANGE CHUCK

(75) Inventors: Mark S. Huggins, Clemson, SC (US); William H. Aultman, Pickens, SC (US)

(73) Assignee: Power Tool Holders Incorporated, Christiana, DE (US)

(*) Notice: Subject to any disclaimer, the term of this patent is extended or adjusted under 35 U.S.C. 154(b) by 77 days.

(21) Appl. No.: 09/731,685

(22) Filed: Dec. 6, 2000

(65) Prior Publication Data

US 2002/0079656 A1 Jun. 27, 2002

(51) Int. Cl.[7] .............................................. B23B 31/12
(52) U.S. Cl. ........................ 279/61; 279/902; 279/904; 408/240
(58) Field of Search ............................ 279/60–65, 902, 279/904, 140; 408/240

(56) References Cited

U.S. PATENT DOCUMENTS

| | | |
|---|---|---|
| 299,909 A | 6/1884 | Church |
| 562,421 A | 6/1896 | Richards |
| 722,575 A | 3/1903 | Gates |
| 813,864 A | 2/1906 | Coit |
| 4,154,450 A | 5/1979 | Derbyshire |
| 4,381,116 A | 4/1983 | Futter |
| 4,460,296 A | 7/1984 | Sivertson, Jr. |
| 4,526,497 A | 7/1985 | Hatfield |
| 4,660,841 A | 4/1987 | Chouinard |
| 4,695,066 A | 9/1987 | Rohm |
| 4,726,719 A | 2/1988 | Mack |
| 5,195,760 A | 3/1993 | Wheeler et al. |
| 5,511,801 A | 4/1996 | Kanaan et al. |
| 6,241,260 B1 | 6/2001 | Judge et al. |
| 6,260,857 B1 * | 7/2001 | Wienhold et al. ........... 279/140 |

* cited by examiner

Primary Examiner—Steven C. Bishop
(74) Attorney, Agent, or Firm—Nelson Mullins Riley & Scarborough, LLP

(57) ABSTRACT

A chuck includes a generally cylindrical body having a nose section and a tail section. The tail section is adapted to rotate with the drive shaft, and the nose section has an axial bore formed therein. A driver is axially movably disposed about the body. A generally cylindrical sleeve is rotatably mounted about the body. A grip is mounted in the body in communication with the axial bore and in operative communication with the driver. The driver is in communication with the sleeve and the body so that, in a first state of the chuck, rotation of the sleeve with respect to the body in a closing direction moves the grip toward the axis of the axial bore and so that, in a second state of the chuck, the driver is axially reciprocal with respect to the sleeve and the body.

28 Claims, 5 Drawing Sheets

QUICK CHANGE CHUCK

BACKGROUND OF THE INVENTION

The present invention relates generally to chucks for use with drills or electric or pneumatic power drivers. More particularly, the present invention relates to a chuck of the keyless type which may be tightened or loosened by hand.

Both hand and electric or pneumatic tool drivers are well known. Although twist drills are the most common tools used with such drivers, the tools may also comprise screw drivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to a driver by a threaded or tapered bore and may be formed integrally with the drive shaft of the drill.

A wide variety of chucks have been developed in the art. In one form of chuck, three jaws spaced circumferentially approximately 120 degrees apart from each other are constrained by angularly disposed passageways in a body attached to the drive shaft. The chuck is configured so that rotation of the body in one direction with respect to a constrained nut forces the jaws toward or away from a gripping relationship with a tool shank. Such a chuck may be keyless if it can be tightened or loosened by manual rotation.

In another form of chuck, a nut is axially movably disposed about the chuck body so that axial movement of the nut with respect to the chuck body moves the chuck jaws within passageways in the chuck body. The nut defines threads on an outer circumferential surface that mate with threads defined on an inner circumferential surface of a sleeve. Rotation of the sleeve with respect to the chuck body moves the nut axially to drive the jaws within the passageways to grip and ungrip a tool.

Various configurations of keyless chucks are known in the art and are desirable for a variety of applications.

SUMMARY OF THE INVENTION

The present invention recognizes and addresses the foregoing considerations, and others, of prior art construction and methods. Accordingly, it is an object of the present invention to provide an improved chuck for use with a manual or powered driver.

This and other objects are achieved by a chuck for use with a manual or powered driver having a rotatable drive shaft. The chuck includes a generally cylindrical body having a nose section and a tail section. The tail section is adapted to rotate with the drive shaft, and the nose section has an axial bore formed therein. A driver is axially movably disposed about the body. A generally cylindrical sleeve is rotatably mounted about the body. A grip is mounted in the body in communication with the axial bore and in operative communication with the driver. The driver is in communication with the sleeve and the body so that, in a first state of the chuck, rotation of the sleeve with respect to the body in a closing direction moves the grip toward the axis of the axial bore, and so that in a second state of the chuck, the sleeve does not rotate with respect to the body and the driver is axially reciprocal with respect to the sleeve and the body.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
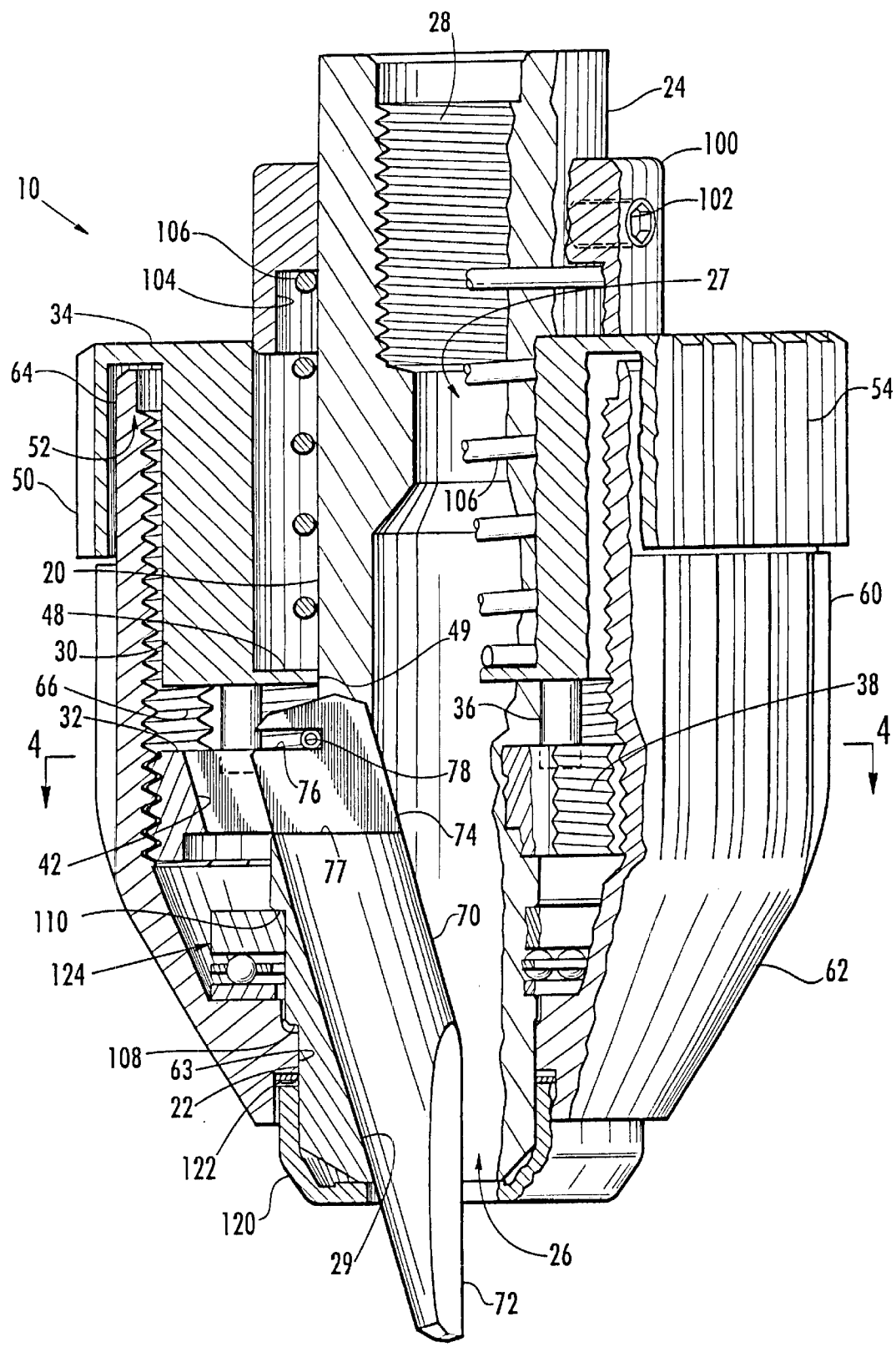
FIG. 1 is a plan view, partly in section, of a chuck constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to present preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
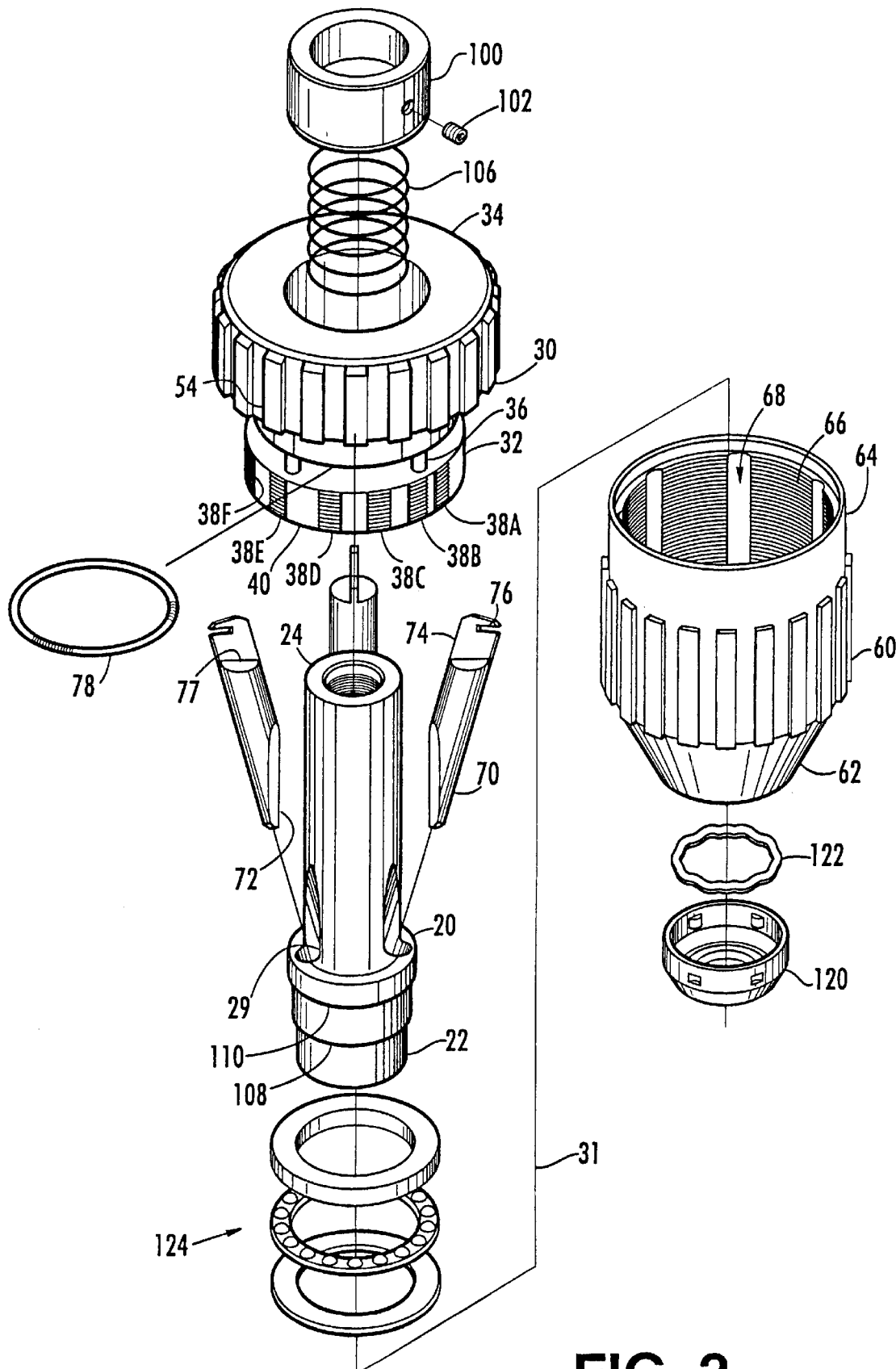
FIG. 2 is an exploded view of the chuck shown in FIG. 1.

Referring to one preferred embodiment illustrated in FIGS. 1 and 2, a chuck 10 includes a body 20, a driver 30, a sleeve 60, and a tool grip including a plurality of jaws 70. Body 20 is elongated and generally cylindrical in shape and includes a nose or forward section 22 and tail or rearward section 24. An axial bore 26 is formed in nose section 22 and is somewhat larger than the largest tool shank that the chuck is designed to accommodate. A threaded bore 28 is formed in tail section 24 and is of a standard size to mate and rotate with the drive shaft of a powered or hand driver (not shown). The bores 26 and 28 may communicate at a central region 27 of body 20. Body 20 includes a plurality of passageways 29 for receipt of the jaws. Passageways 29 are angled with respect to a chuck axis 31 and intersect at a common point ahead of the chuck body. While a threaded bore 28 is described and illustrated, such bore may be replaced with a tapered bore of standard size to mate and rotate with a tapered drive shaft. Furthermore, the body may be formed integrally with the drive shaft.

Driver 30 is axially movably disposed about body 20. In the illustrated embodiment, driver 30 includes a front section 32 and a rear section 34 fastened together by pins 36.

It should be understood, however, that front section 32 and rear section 34 may be held together by any suitable method and may be of integral construction.

Figure 3:
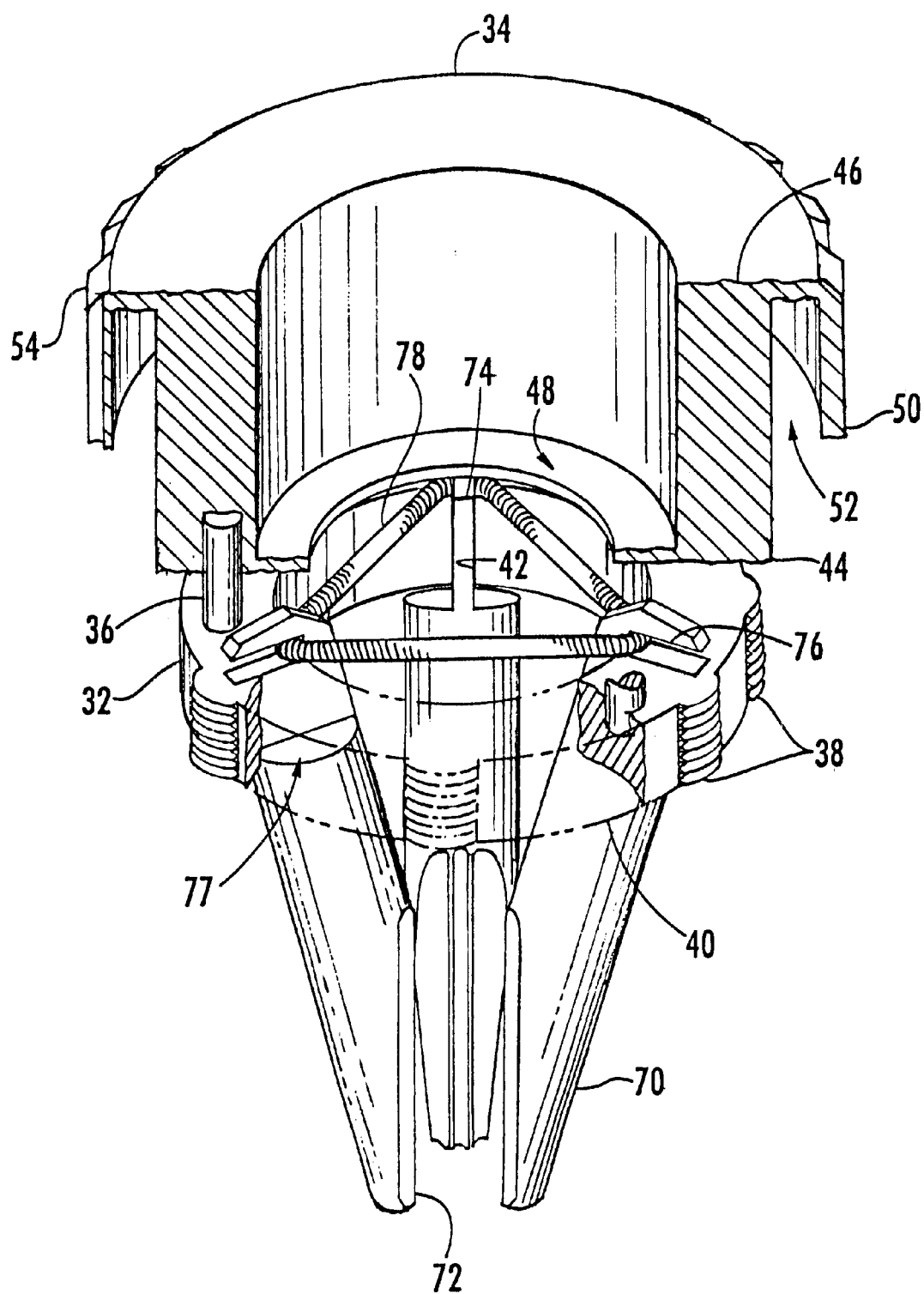
FIG. 3 is a perspective view, partly in section, of the driver and grip shown in FIG. 1 taken in the direction of arrows labeled 4—4.

Referring also to FIG. 3, front section 32 includes a thread 38 defined on an outer circumferential surface of driver 30. Thread 38 is defined by a plurality of threaded tabs 38A–I separated by a plurality of gaps 40. In the preferred embodiment illustrated in the drawings, nine gaps are employed. As discussed in more detail below, each gap 40 defines a different angular width, while each threaded tab 38A–I is approximately one-sixteenth of an inch wide. Thus, as shown in FIGS. 3 and 4B–4D, driver thread 38 is defined by a series of intermittently spaced thread tabs 38A–I. In one preferred embodiment, each of thread tabs 38A–I defines an angular width of approximately 5 degrees.

Figure 4A:
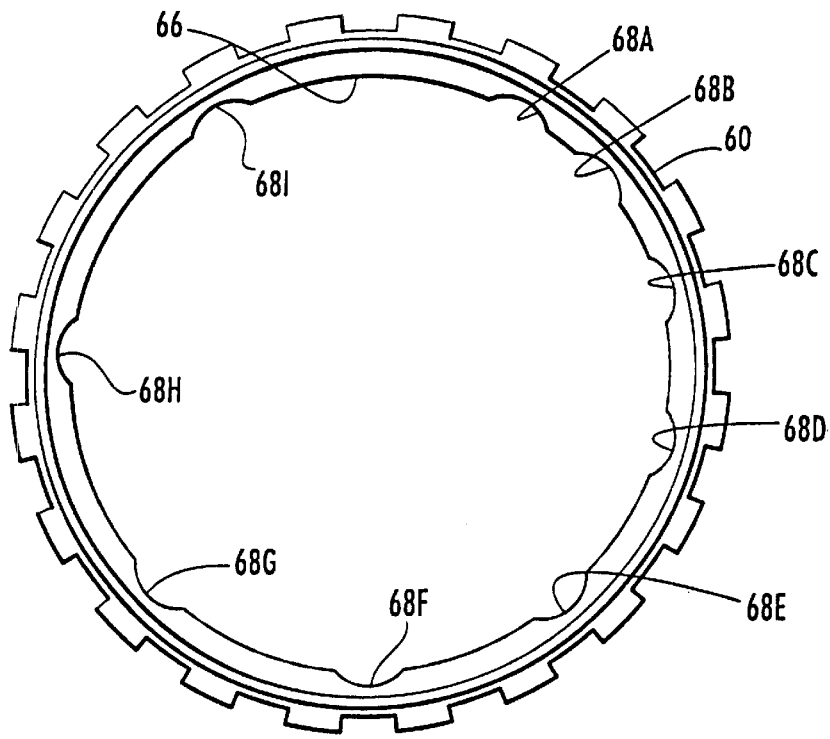
FIG. 4A is a cross-sectional view of the sleeve shown in FIG. 1 taken in the direction of arrows labeled 4—4.
Figure 4B:
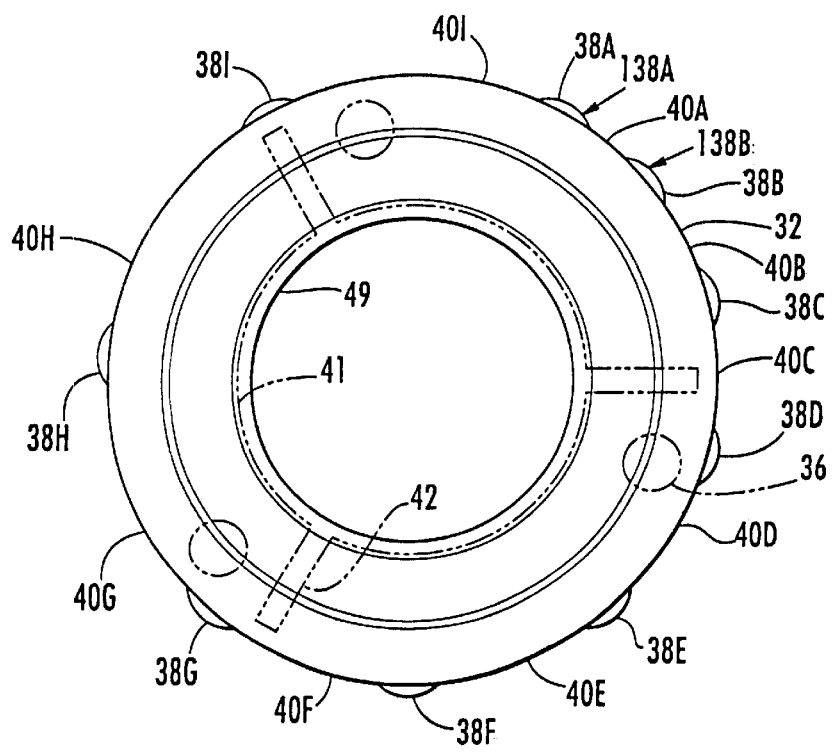
FIG. 4B is a cross-sectional view of portions of the driver shown in FIG. 1 taken in the direction of arrows labeled 4—4.

As shown in FIGS. 3 and 4B, driver forward section 32 defines an aperture 41 through which passes chuck body 20. A plurality of slots 42 having a generally rectangular cross section extend radially outward into front section 32 from aperture 41. Preferably, three slots 42 are employed, and each slot is separated from the adjacent slot by an arc of approximately 120 degrees. As discussed further below, driver slots 42 work together with the chuck grip to move the chuck between its open and closed positions.

As shown in FIG. 3, an annular lip 48 extends radially inward from a forward portion of driver rear section 34 to define an aperture 49 that receives the chuck body. A shelf 50 at the back of rear section 34 forms an axially extending circumferential groove 52 for receipt of a rearward section 64 of front sleeve 60 (FIG. 1). An outer circumferential surface of shelf 50 includes a gripping surface 54, which may include longitudinal ribs to facilitate a user's grip. As discussed further below, driver 30 is in communication with the chuck grip and body 20 so that the driver is rotationally fixed to the body.

Figure 4C:
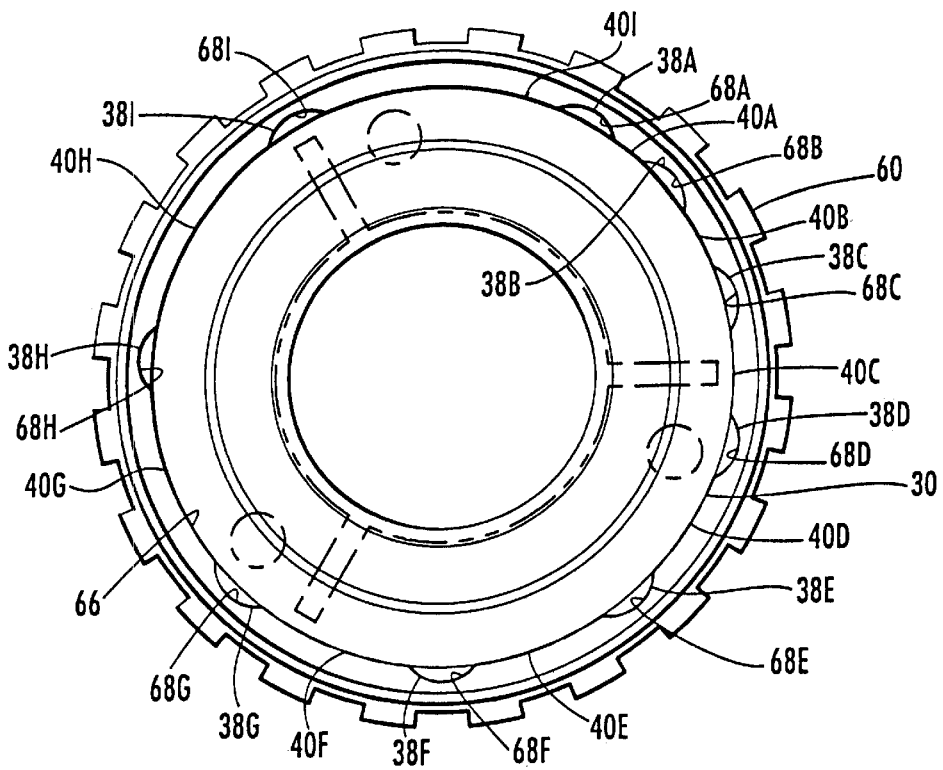
FIG. 4C is a cross-sectional view of portions of the driver and the sleeve shown in FIG. 1 taken in the direction of arrows labeled 4—4.

Front sleeve 60 is generally cylindrical in shape and includes a forward section 62 and rearward section 64. A radially inward extending annular lip portion 63 defined on forward section 62 is received over body nose section 22. Front sleeve 60 further defines a thread 66 on an inner circumferential surface of rearward section 64. As discussed in more detail below, thread 66 defines a plurality of circumferentially spaced gaps 68A–I that align with tabs 38A–I when the chuck is in its second state (FIG. 4C).

In the illustrated embodiment, the chuck grip includes a plurality of jaws 70 slideably received within passageways 29. Referring to FIG. 3, each jaw includes a tool engaging jaw face 72 and a jaw end 74. Each jaw end 74 has a generally rectangular cross-section that is received by a respective driver slot 42 and defines a radially inward extending jaw slot 76. Each jaw slot 76 extends rearwardly beyond an axially rearward facing surface of driver front section 32. A garter spring 78 is received in each jaw slot 76 to hold jaws 70 axially with respect to driver 30. Each jaw end 74 includes a pair of shoulder portions 77 that abut a front face of driver 30. Thus, garter spring 78 and shoulders 77 hold jaws 70 in alignment with respect to the driver and within passageways 29. However, as should be understood by one skilled in the art, other suitable jaw end configurations are contemplated by the present invention. For example, T-shaped or semi-circular shaped jaw ends could fit within correspondingly shaped radially inward directed bores defined in the driver. It should be understood that the angle between the chuck axis and the direction of the correspondingly shaped driver bores may vary to accommodate the particular type of jaw end configuration. For example, in the preferred embodiment illustrated, jaw shoulders 77 are perpendicular to chuck axis 31.

While the chuck grip of the illustrated embodiment includes three jaws, the grip may include any other suitable method of gripping and ungripping a tool. For example, the jaws and passageways of the illustrated embodiment could be replaced by a wider axial bore housing a collet to grip a tool. Axially forward or rearward movement of the driver with respect to the body and a collet drives an inner surface of the driver against an outer surface of the collet to grip a tool. It should be understood, however, that such an arrangement may involve use of a different thread pitch. One example of a collet that may be utilized within such an arrangement is disclosed in U.S. Pat. No. 5,324,050, commonly assigned to the present assignee and the entire disclosure of which is incorporated by reference herein.

Referring to FIG. 1, a generally cylindrical stop 100 is axially and rotationally fixed to body tail section 24 by a hex screw 102, or other suitable method, for example snap rings, threading, staking, crimping, press-fitting, or the like. An axially forward and radially inward facing surface of stop 100 defines an axially extending circumferential groove 104 that receives a coil spring 106. Coil spring 106 abuts an axially rearward facing surface of driver annular lip 48 to bias driver toward a forward end of the chuck.

Body forward section 22 includes a first ledge 108 and a second ledge 110 defined axially rearward of the first ledge. Front sleeve lip 63 is received by body forward section 22 axially forward of first ledge 108. A nose piece 120 is press-fit to body forward section 22 axially forward of lip 63. Nose piece 120 includes a plurality of tabs 121 disposed within a groove 23 on forward section 22. Tabs 121 and groove 23 form a secondary retention mechanism to hold the nose piece axially with respect to the chuck body. A wave spring 122 is disposed between nose piece 120 and sleeve lip 63. A bearing assembly 124 is disposed about body forward section 22 between second ledge 110 and lip 63.

Figure 4D:
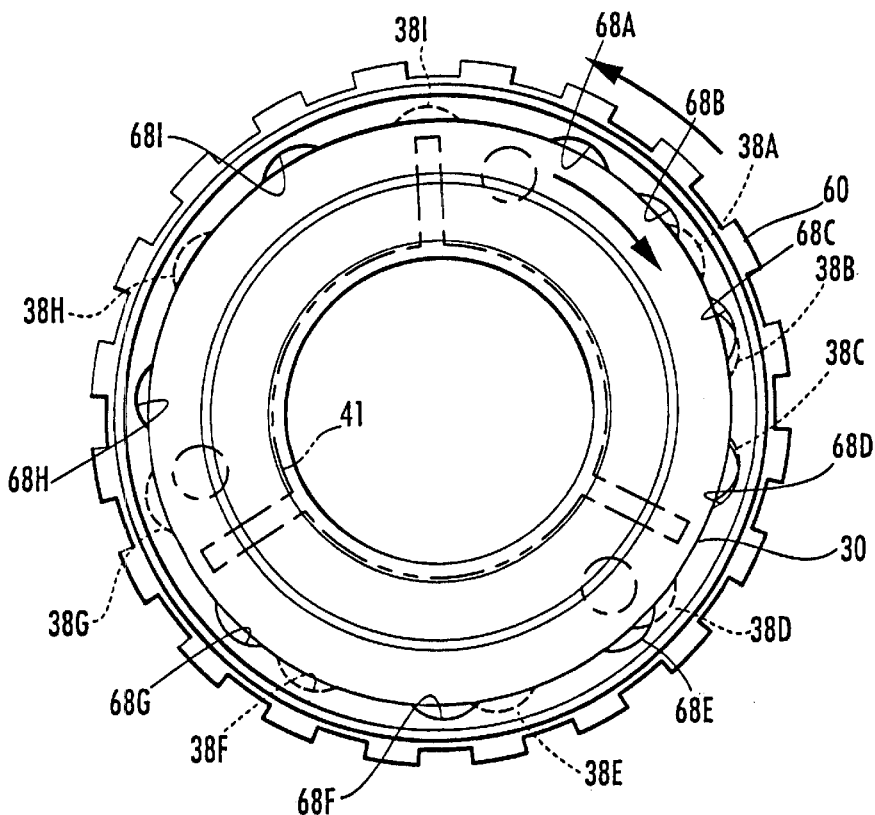
FIG. 4D is a cross-sectional view of portions of the driver and the sleeve shown in FIG. 1 taken in the direction of arrows labeled 4—4.

Referring now to FIGS. 4A–4D, each driver thread gap 40A–I is defined immediately clockwise of a driver thread tab 38A–I having a corresponding alphanumerical reference. For example, gap 40A is clockwise of thread tab 38A. As shown in FIG. 4C, tabs 38A–I are aligned with gaps 68A–I. Thus, the chuck is in the second state, and driver 30 is axially reciprocal with respect to the front sleeve 60. However, as shown in FIG. 4D, relative rotation between front sleeve 60 and driver 30, which is rotationally held to the body by jaws 70 within passageways 29, moves driver threads 38 into engagement with front sleeve thread 66 so that the chuck is in its first state. Wave spring 122 permits front sleeve 60 to move sufficiently in the axial direction to align driver thread 38 with front sleeve thread 66 as the front sleeve rotates. Further rotation of front sleeve 60 with respect to driver 30 moves the driver axially with respect to the chuck body, thereby driving jaws 70 within passageways 29 to grip or ungrip a tool.

Gap 40A defines an angular width of approximately 20 degrees from the center of tab 38A to the center of tab 38B. In the embodiment illustrated in the Figures, the angular width defined by each subsequent gap, moving clockwise, increases by approximately 5 degrees. Thus, gap 40B is approximately 25 degrees. Gap 40C is approximately 30 degrees. Gap 40D is approximately 35 degrees. Gap 40E is approximately 40 degrees. Gap 40F is approximately 45 degrees. Gap 40G is approximately 50 degrees. Gap 40H is approximately 55 degrees, and gap 40I is approximately 60 degrees. Again, each gap is measured from centerline to centerline of its adjacent tabs 38A–I. This orientation allows tabs 38A–I to align with gaps 68A–I at only one rotational position of sleeve 60 with respect to driver 30. In this second state, driver 30 can move axially with respect to sleeve 60 and body 20 absent rotation between the sleeve and the body.

As mentioned above, the width of each driver thread tab 38 is approximately one-sixteenth of an inch. Accordingly, each sleeve gap 68A–I is slightly greater than one-sixteenth of an inch to allow the sleeve's axial movement with respect to the driver when the chuck is in the second state as shown in FIG. 4C. Correspondingly, each section of thread 66 between adjacent gaps 68A–I is slightly less than the angular width of the non-threaded portion of its opposing gap 40A–I when the chuck is in the second state.

To close the chuck onto a tool (not shown), an operator initially rotates sleeve 60 until gaps 68A–I align with their corresponding tabs 38A–I. In this condition, the operator and spring 106 push the driver, and therefore the jaws, forward until the jaws close onto the tool. At this point, the operator can further tighten the jaws onto the tool by rotating front sleeve 60 in the closing direction with respect to the body so that the interaction between threads 66 and threads 38 drive the driver and jaws forward. Referring specifically to FIG. 4D, when the sleeve is rotated away from the second state, a maximum of two tabs 38 can be aligned with any gaps 68 until the sleeve rotates one full turn around the body back to the second state. In the illustrated embodiment, threads 38 and threads 66 define a 32-pitch thread configuration, and less than a full turn is typically required to tighten the jaws onto a tool after the jaws initially close. It should be understood, however, that various configurations are possible depending on various factors, for example the size of the chuck, the thread design and the force of spring 106.

To open the chuck to remove or change a tool, the operator rotates front sleeve 60 in an opening direction opposite the closing direction until the driver thread tabs 38A–I are aligned within the sleeve gaps 68A–I. The operator then pulls driver 30 rearward against the force of spring 106 to release the grip between the jaws and the tool. A stop (not shown) may be disposed between the sleeve and the body so that an operator can rotate the sleeve to reach the second state of the chuck only by rotating the front sleeve in the opening direction.

While one or more preferred embodiments of the invention have been described above, it should be understood that any and all equivalent realizations of the present invention are included within the scope and spirit thereof. The embodiments depicted are presented by way of example only and are not intended as limitations upon the present invention. For example, it should be understood that other angular configurations of thread gaps and tabs are contemplated by the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A chuck for use with a manual or powered driver having a rotatable drive shaft, said chuck comprising:
   a generally cylindrical body having a nose section and a tail section, said tail section is adapted to rotate with the drive shaft, said nose section defining an axial bore therein;
   a driver axially movably disposed about said body;
   a generally cylindrical sleeve rotatably mounted about said body, wherein a portion of said driver is outside said sleeve; and
   a grip mounted in said body in communication with said axial bore and in operative communication with said driver,
   wherein said sleeve and said driver are configured with respect to each other so that, in a first state of said chuck, rotation of said sleeve in a closing direction with respect to said body moves said grip toward the axis of said axial bore and, in a second state of said chuck, said driver is axially reciprocal with respect to said sleeve and said body without relative rotation between said sleeve and said driver.

2. The chuck as in claim 1, wherein said grip includes a plurality of jaws.

3. The chuck as in claim 2, wherein said body nose section includes a plurality of angularly disposed passageways formed therethrough and intersecting said axial bore, and wherein each said passageway slidably receives a separate one of said jaws.

4. The chuck as in claim 1, wherein said driver is biased toward said body nose section in said second state.

5. The chuck as in claim 4, including
   a stop disposed about said body and axially fixed to said body tail section; and
   a first spring disposed between said stop and said driver,
   wherein said first spring biases said driver toward said body nose section.

6. The chuck as in claim 5, wherein said first spring includes a coil spring.

7. The chuck as in claim 1, wherein said grip is mounted in said body nose section.

8. The chuck as in claim 1, said driver including a rear sleeve in communication with said driver so that axially rearward movement of said rear sleeve with respect to said body moves said grip toward an open state of said chuck.

9. The chuck as in claim 8, wherein said rear sleeve is axially and rotationally fixed to said driver.

10. A chuck for use with a manual or powered driver having a rotatable drive shaft, said chuck comprising:
    a generally cylindrical body having a nose section and a tail section, said tail section is adapted to rotate with the drive shaft, said nose section defining an axial bore therein;
    a driver axially movably disposed about said body;
    a generally cylindrical sleeve rotatably mounted about said body; and
    a grip mounted in said body in communication with said axial bore and in operative communication with said driver,
      wherein said sleeve and said driver are configured with respect to each other so that, in the first state of said chuck, rotation of said sleeve in a closing direction with respect to said body moves said grip toward the axis of said axial bore and, in a second state of said chuck, said driver is axially reciprocal with respect to said sleeve and said body without relative rotation between said sleeve and said driver,
    wherein said sleeve includes threads on an inner circumferential surface of said sleeve, and
    wherein said driver includes a nut having threads formed on an outer circumferential surface in driving engagement with said sleeve threads in said first state of said chuck so that rotation of said sleeve with respect to said body and said driver moves said grip toward or away from said axial bore, and in said second state of said chuck, said driver threads are disengaged from said sleeve threads to permit axial movement of said driver with respect to said sleeve and said body.

11. The chuck as in claim 10, wherein said driver defines a plurality of axially aligned gaps formed within said driver thread and configured so that said driver thread includes a plurality of intermittently spaced thread tabs, wherein said sleeve defines a plurality of axially aligned gaps formed within said sleeve thread, and wherein said sleeve gaps and said driver thread tabs are aligned when said chuck is in said second state.

12. The chuck as in claim 11, wherein said driver defines nine said thread tabs, and said sleeve defines nine said thread gaps.

13. The chuck as in claim 11, wherein each said sleeve gap is approximately one-sixteenth of an inch in width.

14. The chuck as in claim 11, wherein each said driver thread tab is approximately one-sixteenth of an inch in width.

15. The chuck as in claim 11, wherein each said driver gap defines an unequal angular width.

16. The chuck as in claim 12, wherein the angular distance defined between adjacent pairs of said thread tabs is at least twenty degrees but not greater than sixty degrees so that said chuck defines said second state in only one rotational position of said sleeve with respect to said driver.

17. The chuck as in claim 11, wherein said chuck is in said second state in only one rotational position of said driver with respect to said sleeve.

18. A chuck for use with a manual or powered driver having a rotatable drive shaft, said chuck comprising:
- a generally cylindrical body having a nose section and a tail section, said tail section is adapted to rotate with the drive shaft, said nose section defining an axial bore therein;
- a driver axially movably disposed about said body;
- a generally cylindrical sleeve rotatably mounted about said body;
- a grip mounted in said body in communication with said axial bore and in operative communication with said driver;
- a stop disposed about said body and axially fixed to said body tail section;
- a first spring disposed between said stop and said driver; and
- a second spring disposed between said sleeve and said body that biases said sleeve in the axially rearward direction with respect to said body,
- wherein said sleeve and said driver are configured with respect to each other so that, in a first state of said chuck, rotation of said sleeve in a closing direction with respect to said body moves said grip toward the axis of said axial bore and, in a second state of said chuck, said driver is axially reciprocal with respect to said sleeve and said body without relative rotation between said sleeve and said driver, and
- wherein said first spring biases said driver toward said body nose section in said second state.

19. A chuck for use with a manual or powered driver having a rotatable drive shaft, said chuck comprising:
- a generally cylindrical body having a nose section and a tail section, said tail section being adapted to rotate with the drive shaft and said nose section defining therein an axial bore and a plurality of angularly disposed passageways intersecting at a common point in said axial bore;
- a driver axially movably disposed about said body, said driver including a forward section and a rearward section, said forward section including a nut, said nut defining intermittently spaced threaded tabs on an outer circumferential surface of said driver forward section;
- a generally cylindrical sleeve rotatably mounted about said body, said sleeve defining a thread on an inner circumferential surface thereof, said thread including a plurality of intermittently spaced gaps; and
- a plurality of jaws in driving engagement with said driver, each said jaw being slidably received within one of said passageways,
- wherein, in a first state of said chuck, said driver is in communication with said body and said sleeve so that rotation of said sleeve in a closing direction with respect to said body moves said jaws toward an axis of said axial bore, and in a second state of said chuck, said threaded tabs are aligned with said sleeve gaps so that said driver is axially reciprocal with respect to said sleeve and said body.

20. The chuck as in claim 19, including
- a stop disposed about said body and axially fixed to said body tail section, and
- a first spring disposed between said stop and said driver rearward section,
- wherein said first spring biases said driver toward said body nose section.

21. The chuck as in claim 19, wherein said driver rearward section includes a rear sleeve in communication with said driver and rotationally fixed to said body, wherein axially rearward movement of said rear sleeve moves said chuck toward an open position of said chuck.

22. The chuck as in claim 19, wherein said driver forward section includes a plurality of axially aligned gaps defined between adjacent said thread tabs.

23. The chuck as in claim 19, wherein said driver defines at least three said thread tabs and said sleeve defines at least three said thread gaps.

24. The chuck as in claim 19, including a second spring disposed about said body nose section between said sleeve and said body.

25. The chuck as in claim 19, wherein said sleeve and said driver are configured so that said threaded tabs and said sleeve gaps are aligned in only one rotational position of said sleeve with respect to said driver.

26. The chuck as in claim 19, wherein the angular distance defined between each said adjacent threaded tab is at least ten degrees but not greater than ninety degrees.

27. The chuck as in claim 19, wherein each said intermittently spaced threaded tab defines an equal width, wherein each said intermittently spaced sleeve gap defines an equal width, and wherein said threaded tabs align with said sleeve gaps in only one rotational position of said driver with respect to said sleeve.

28. A chuck for use with a manual or powered driver having a rotatable drive shaft, said chuck comprising:
- a generally cylindrical body having a nose section and a tail section, said tail section is adapted to rotate with the drive shaft, said nose section defining an axial bore therein and including a plurality of angularly disposed passageways formed in said nose section and intersecting at a common point in said axial bore, said nose section including an axially forward facing ledge portion;

a driver axially movably disposed about said body and rotationally fixed to said body, said driver including a forward section and a rearward section, said rearward section including a rear sleeve having a gripping surface on its outer circumference and said forward section including a nut wherein said nut defines at least five intermittently spaced uniform threaded tabs on an outer circumferential surface of said nut;

a generally cylindrical front sleeve rotatably mounted about said body, said front sleeve defining a thread on an inner circumferential surface, said sleeve thread including at least five intermittently spaced uniform gaps and said front sleeve defining a gripping surface on an outer circumferential surface thereof;

a plurality of jaws in driving engagement with said driver, each said jaw being slidably received within one of said passageways;

a stop axially fixed to said body tail section;

a coil spring disposed about said body between said stop and said front sleeve;

a nose piece axially fixed to said body nose section;

a bearing assembly disposed between said ledge portion and said front sleeve; and a wave spring disposed between said nose piece and said front sleeve, wherein, in a first state of said chuck, said driver is in communication with said body and said sleeve so that rotation of said sleeve in a closing direction with respect to said body moves said grip toward an axis of said axial bore, and in a second state of said chuck, said threaded tabs are aligned with said sleeve gaps so that said driver is axially reciprocal with respect to said sleeve and said body, wherein in said second state of said chuck, said threaded tabs are aligned with said sleeve gaps so that movement of said rear sleeve with respect to said body in the axially rearward direction moves said jaws radially away from an axis of said axial bore toward an open state of said chuck, and wherein said chuck is in said second state in only one rotational position of said driver with respect to said sleeve.

* * * * *

UNITED STATES PATENT AND TRADEMARK OFFICE
CERTIFICATE OF CORRECTION

PATENT NO. : 6,505,840 B2
DATED : January 14, 2003
INVENTOR(S) : Mark S. Huggins and William H. Aultman It is certified that error appears in the above-identified patent and that said Letters Patent is hereby corrected as shown below:

Column 6,
Line 54, before "first state", please delete the word "the" and replace with -- a --.

Column 8,
Lines 39 and 41, please change the word "thread" to -- threaded --.
Line 42, before "gaps", please delete the word "thread" and replace with -- sleeve --.

Signed and Sealed this

Second Day of August, 2005

JON W. DUDAS
*Director of the United States Patent and Trademark Office*